J. F. Finger,
Wrist Pin Turner.
No. 113,038. Patented Mar. 28, 1871.
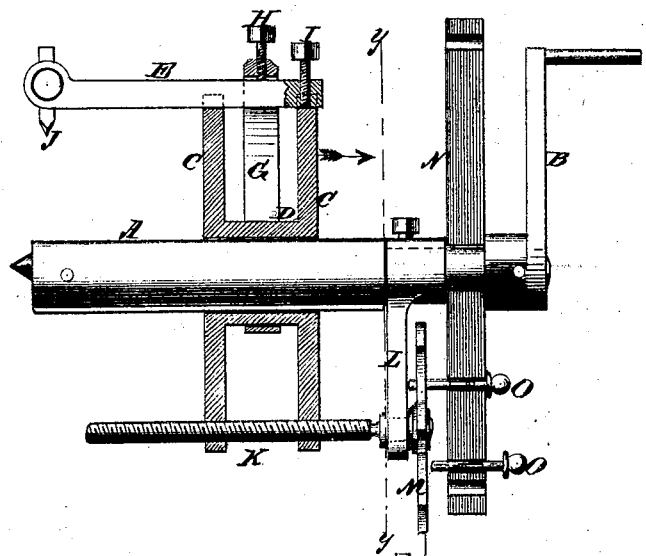
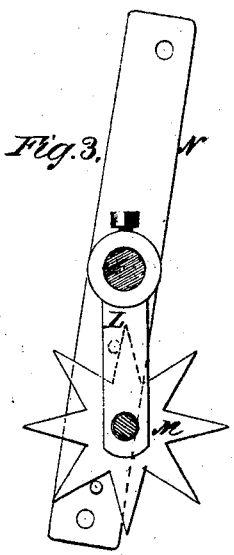
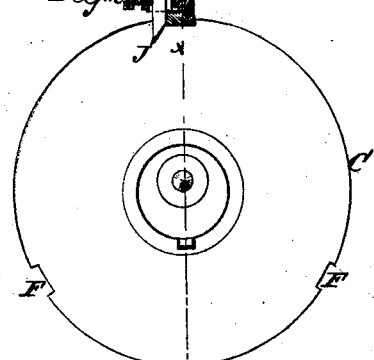
Witnesses:
John Beeler
L. S. Mabee
Inventor:
J. F. Finger
per Munn & Co
Attorneys.

UNITED STATES PATENT OFFICE.

JOHN FRANKLIN FINGER, OF WILMINGTON, NORTH CAROLINA.

IMPROVEMENT IN HAND TURNING AND BORING MACHINES.

Specification forming part of Letters Patent No. 113,038, dated March 28, 1871.

*To all whom it may concern:*

Be it known that I, JOHN FRANKLIN FINGER, of Wilmington, in the county of New Hanover and State of North Carolina, have invented a new and useful Improvement in Hand Turning and Boring Machine; and I do hereby declare that the following is a full, clear, and exact description thereof, which will enable others skilled in the art to make and use the same, reference being had to the accompanying drawing, forming part of this specification.

The object of this invention is to provide suitable and convenient means for turning and repairing wrist-pins in steam-engine and other cranks, and also for boring out cranks or "truing" the wrist-pin holes; and the invention consists in an apparatus which is secured to the crank or other fixture by a clamp, and the tool made adjustable, as will be hereinafter more fully described.

In the accompanying drawing, Figure 1 is a sectional side elevation of the machine, the section being on the line $x\ x$ of Fig. 2. Fig. 2 is a front view. Fig. 3 is a vertical section, showing the feeding device detached, the section being on the line $y\ y$ of Fig. 1.

Similar letters of reference indicate corresponding parts.

A is the spindle or mandrel, which is revolved by means of the crank B on its outer end. C C are two disks, connected together by a sleeve, D, to which the tool-bar E is fastened in the recesses F, band G, set-screw H, and screw I. J is the tool or cutter, fastened in the end of the tool-bar in the usual manner.

The disks C C, with the tool-bar, are made to slide on the mandrel, and are fed along by means of the screw K, which is fastened to the mandrel by the arm L, and which screw consequently does not move longitudinally. M is a star-wheel on the end of this screw. N is the fixed clamp, through which there are two pins, $o\ o$. As the star-wheel revolves, one of these pins is allowed to engage with the wheel, by means of which the wheel is revolved and the feed-screw turned.

It will be understood that the disk-wheels and tool revolve with the mandrel, while the crank to be operated on is stationary. The disks and the sleeve (by which they are connected) slide or are fed forward on a "feather" and groove on the mandrel. The clamp N being stationary, the feed-screw will be turned one tooth each revolution of the mandrel, and the cutter will be fed forward a corresponding distance.

The pins $o\ o$ are so placed that one of them operates to turn the star-wheel for feeding up and the other for drawing back the tool.

For boring or turning out a wrist-hole in the crank, another tool-bar is used, (see Fig. 4,) which has an offset, P, which brings the point of the tool on a level with the center, or to any position to which it may be adjusted.

With this machine a wrist-pin which has been worn oval, or is otherwise untrue, may be repaired and turned true without removing or disturbing the shaft. Wrist-pins may also, by re-turning, be brought to the proper line or center. The holes may also be trued out, so that the wrist-pin may be made to run correctly, or parallel with the shaft to which the crank is attached.

Having thus described my invention, I claim as new and desire to secure by Letters Patent—

The mandrel A, disks C C, clamp G, arm E, feed-screw K, star-wheel M, pins $o\ o$, and clamp N, combined and arranged substantially as and for the purposes described.

JOHN FRANKLIN FINGER.

Witnesses:
EDW. KIDDER,
JAMES ALDERMAN.